US011027974B2

(12) United States Patent
Shimizu et al.

(10) Patent No.: US 11,027,974 B2
(45) Date of Patent: Jun. 8, 2021

(54) REMOVAL OF MOISTURE FROM HYDRAZINE

(71) Applicant: Matheson Tri-Gas, Inc., Basking Ridge, NJ (US)

(72) Inventors: Hideharu Shimizu, Longmont, CO (US); Mark Raynor, Longmont, CO (US); Daniel Tempel, Erie, CO (US); Robin Gardiner, Longmont, CO (US); Daniel Alvarez, Jr., Oceanside, CA (US)

(73) Assignee: Matheson Tri-Gas, Inc., Basking Ridge, NJ (US)

( * ) Notice: Subject to any disclaimer, the term of this patent is extended or adjusted under 35 U.S.C. 154(b) by 816 days.

(21) Appl. No.: 15/806,938

(22) Filed: Nov. 8, 2017

(65) Prior Publication Data

US 2018/0127272 A1 May 10, 2018

Related U.S. Application Data

(60) Provisional application No. 62/419,029, filed on Nov. 8, 2016.

(51) Int. Cl.
*B01D 53/26* (2006.01)
*C01B 21/16* (2006.01)
(Continued)

(52) U.S. Cl.
CPC ............ *C01B 21/16* (2013.01); *B01D 53/261* (2013.01); *B01D 53/263* (2013.01); *B01D 53/28* (2013.01);
(Continued)

(58) Field of Classification Search
CPC .... B01D 53/261; B01D 53/263; B01D 53/28; B01D 2251/30; B01D 2251/302; B01D 2251/304; B01D 2251/306; B01D 2251/403; B01D 2251/404; B01D 2251/406; B01D 2251/408; B01D 2252/30; B01D 2253/104; B01D 2253/106; B01D 2253/1085; B01D 2253/112; B01D 2253/1122; B01D 2253/1124; B01D 2253/306; B01D 2253/311; B01D 2256/00; B01J 20/04; B01J 20/041; B01J 20/08; B01J 20/103; B01J 20/26; B01J 20/28051; B01J 20/28064; B01J 20/28071; B01J 20/28073; B01J 20/28076; B01J 20/282; B01J 20/283; B01J 20/284; B01J 20/285;
(Continued)

(56) References Cited

U.S. PATENT DOCUMENTS 2,698,286 A * 12/1954 Bircher, Jr. ............. C01B 21/16
203/12
3,553,147 A 1/1971 Garcia
(Continued)

FOREIGN PATENT DOCUMENTS

GB 713792 8/1954

*Primary Examiner* — Frank M Lawrence, Jr.

(57) ABSTRACT

The present invention generally relates to the field of gas and liquid phase desiccation. In particular, the present invention relates to methods for removing moisture (and hence oxygen precursors) from hydrazine, thereby providing a high purity source gas suitable for use in vapor deposition processes, such as but not limited to, chemical vapor deposition (CVD) or an atomic layer deposition (ALD).

25 Claims, 6 Drawing Sheets

(51) Int. Cl.
*B01D 53/28* (2006.01)
*B01J 20/04* (2006.01)
*B01J 20/08* (2006.01)
*B01J 20/10* (2006.01)
*B01J 20/26* (2006.01)
*B01J 20/28* (2006.01)
*B01J 20/282* (2006.01)
*B01J 20/283* (2006.01)
*B01J 20/284* (2006.01)
*B01J 20/285* (2006.01)

(52) U.S. Cl.
CPC ............. *B01J 20/04* (2013.01); *B01J 20/041* (2013.01); *B01J 20/08* (2013.01); *B01J 20/103* (2013.01); *B01J 20/26* (2013.01); *B01J 20/282* (2013.01); *B01J 20/283* (2013.01); *B01J 20/284* (2013.01); *B01J 20/285* (2013.01); *B01J 20/28061* (2013.01); *B01J 20/28064* (2013.01); *B01J 20/28071* (2013.01); *B01J 20/28073* (2013.01); *B01J 20/28076* (2013.01); *B01D 2251/30* (2013.01); *B01D 2251/302* (2013.01); *B01D 2251/304* (2013.01); *B01D 2251/306* (2013.01); *B01D 2251/402* (2013.01); *B01D 2251/404* (2013.01); *B01D 2251/406* (2013.01); *B01D 2251/408* (2013.01); *B01D 2252/30* (2013.01); *B01D 2253/104* (2013.01); *B01D 2253/106* (2013.01); *B01D 2253/1085* (2013.01); *B01D 2253/112* (2013.01); *B01D 2253/1122* (2013.01); *B01D 2253/1124* (2013.01); *B01D 2253/306* (2013.01); *B01D 2253/311* (2013.01); *B01D 2256/00* (2013.01); *B01J 2220/52* (2013.01); *C01P 2006/82* (2013.01)

(58) Field of Classification Search
CPC .... B01J 2220/52; C01B 21/16; C01P 2006/82
USPC .............................................. 95/117; 423/407
See application file for complete search history.

(56) References Cited

U.S. PATENT DOCUMENTS

| | | | |
|---|---|---|---|
| 3,598,546 A | | 8/1971 | Good et al. |
| 4,677,227 A | | 6/1987 | Osborg et al. |
| 5,035,775 A | * | 7/1991 | Quackenbush .......... B01D 3/34 203/12 |
| 5,591,417 A | * | 1/1997 | Buchanan .............. B01D 53/04 423/210 |
| 10,214,420 B2 | * | 2/2019 | Alvarez, Jr. ............ C01B 21/16 |
| 2006/0086247 A1 | | 4/2006 | Vininsky et al. |
| 2009/0318662 A1 | * | 12/2009 | Taniguchi .......... C08G 65/4012 528/327 |
| 2019/0309411 A1 | * | 10/2019 | Spiegelman ...... C23C 16/45536 |

* cited by examiner

REMOVAL OF MOISTURE FROM HYDRAZINE

CROSS REFERENCE TO OTHER APPLICATIONS

This application claims benefit of priority to U.S. Provisional Application No. 62/419,029, filed Nov. 8, 2016, the disclosure of which is fully incorporated herein by reference.

BACKGROUND OF THE INVENTION

1. Field of the Invention

The present invention generally relates to the field of gas and liquid phase desiccation. In particular, the present invention relates to methods for removing moisture (and hence oxygen precursors) from hydrazine, thereby providing a high purity source gas suitable for use in vapor deposition processes, such as but not limited to, chemical vapor deposition (CVD) or an atomic layer deposition (ALD).

2. Description of the State of the Art

Miniaturization of electronic devices has created an increasing demand for very thin insulator films. Silicon nitride films, widely used in the semiconductor industry for their passivating and/or dielectric properties, are considered an important key to further miniaturization. Direct thermal nitridation of the silicon by ammonia at temperatures above 900° C. is currently being examined as an alternate to the commonly used method in industry of chemical vapor deposition. However, high solid-state diffusion rates of Si and N at 900° C. cause degradation of the electrical properties and limit the minimum obtainable nitride layer thickness. Ammonia is reaching limitations due to reduced thermal budgets and plasma methods may be overly aggressive or lead to non-uniformity in High Aspect Ratio (HAR) structures, such as nanowire based devices.

Nanowire-based devices are considered nowadays as one of the most promising alternatives to conventional microelectronic facilities, which can promote further shrinking of device sizes and increase their functionality. The unique properties of one-dimensional (1D) nanowires arise due to their low dimensionality and hence by quantum-mechanical properties and surface dominated features. From the technological point of view, they have one more advantage. Due to high aspect ratios, the length of nanowires lies in the micrometer range reaching even millimeter sizes. Such "large" elements can be easily handled and manipulated when building different nano-devices and circuits.

Mixtures of hydrazine and very strong oxidizers are hypergolic (i.e., they auto-ignite on contact). Hydrazine and hydrazine blends are used as propellant on board space vehicles. Hydrazine was first used during Worlds War II as a component in rocket fuel mixtures. A 30% mix by weight with 57% methanol and 13% water was used in bipropellant rocket fuels.

Hydrazine can have significant amounts of moisture in it as an impurity and in order to be viable in vapor deposition processes, it is critical that any moisture present in the hydrazine be removed to ultimately minimize oxide impurities.

The use of hydrazine in a gas phase has been limited due to purity concerns and safety concerns. Therefore, there is a need to overcome these problems and provide for an effective desiccant and desiccation process in which a substantially moisture free gaseous hydrazine is provided for use in industries that require these ultra-pure levels, while also providing a mechanism for safe handling of this gas. Furthermore, there remains a need for a hydrazine composition in a vapor phase having moisture levels less than 1.0 ppm and preferably in the ranges of 1 ppb to 1.0 ppm or from 1 ppb to 50 ppb or from 50 ppb to 100 ppb or from 0.1 ppm to 1.0 ppm.

BRIEF SUMMARY OF THE INVENTION

Methods, compositions and devices for producing a substantially moisture free process gas stream, particularly a hydrazine gas stream, are provided.

In one aspect, the invention relates to a process for drying a gaseous hydrazine process stream to remove a moisture impurity therefrom, comprising: contacting the moisture impurity-containing gaseous hydrazine with a purifier media including a support having associated therewith one or more members of the group consisting of: an active scavenging moiety selected form one or more members of the group consisting of: (i) alkali metal compounds, such as but not limited to $LiNH_2$, dispersed on a support having a surface area in the range of 750-820 $m^2/g$ and a pore volume of 0.6 to 1.5 ml/g (referred to herein as the "Alkali Metal Media"); (ii) metal oxide or hydroxide compounds having the formula $M_xO_y$ or $M(OH)_x$ wherein the metal (M) is selected from the group consisting Na, K, Li, Rb, Cs, Mg, Ca, Sr and Ba; x is an integer from 1-6 and y is an integer of 1-12 and the metal is dispersed on a support having a surface area in the range of 200-230 $m^2/g$ and a pore volume of 0.4 to 0.8 ml/g (referred to herein as the "Metal Oxide Media"); and (iii) a silica-based material with a silica to alumina mole ratio greater than 800 having a surface area in the range of 280-330 $m^2/g$ and a pore volume of 1.0 to 1.5 ml/g (referred to herein the "Silica Media").

In a preferred aspect, the scavenger as described above, utilizes as the support a material selected from the group consisting of Amberlite resin, carbon-based material, alumina or silica.

Still another aspect of the invention relates to an apparatus for drying a gaseous hydrazine.

This invention further provides hydrazine in a vapor phase having a moisture level of less than 1.0 ppm and preferably in the ranges of 1 ppb to 1.0 ppm or from 1 ppb to 50 ppb or from 50 ppb to 100 ppb or from 0.1 ppm to 1.0 ppm.

In another aspect of the invention, a method of storing and stabilizing hydrazine is provided. The method includes providing a vessel containing a non-volatile solvent, such as but not limited to an ionic liquid therein. The hydrazine is contacted with the ionic liquid for take-up of the hydrazine by the ionic liquid. The hydrazine is then stored within the ionic liquid for a period of time, during which period of time there is substantially no decomposition of the hydrazine.

The methods, compositions, and devices described herein are generally applicable to a wide variety of process gas stream, particularly non-aqueous hydrazine solutions wherein the hydrazine solutions contain non-aqueous components.

In certain embodiments, the solution comprises pure hydrazine, meaning in which no other chemicals are deliberately included but allowing for incidental amounts of impurities. In certain embodiments, the solution comprises from about 50% to about 99% by weight of hydrazine, or from about 65% to about 99%, from about 75% to about 99%, from about 80% to about 99%, from about 85% to about 99%, from about 90% to about 99%, from about 95% to about 99%, from about 96% to about 99%, from about 97% to about 99%, from about 98% to about 99%, or from about 99% to about 100% by weight hydrazine, with the remaining components comprising solvents and/or stabilizers. In some embodiments, the solution comprises hydrazine at concentrations greater than 99.9% purity and, in some embodiments, the solution comprises hydrazine at concentrations greater than 99.99% purity. Selection of an appropriate non-aqueous hydrazine solution will be determine by the requirements of a particular application or process.

Other aspects and features of the invention will be more fully apparent from the ensuing disclosure and appended claims.

Additional embodiments and features are set forth in the description that follows, and in part will become apparent to those skilled in the art upon examination of the specification or may be learned by the practice of the disclosed embodiments. The features and advantages of the disclosed embodiments may be realized and attained by means of the instrumentalities, combinations, and methods described in the specification.

BRIEF DESCRIPTION OF THE DRAWINGS

A further understanding of the nature and advantages of the disclosed embodiments may be realized by reference to the remaining portions of the specification and the drawings.

DETAILED DESCRIPTION OF THE INVENTION

Figure 1:
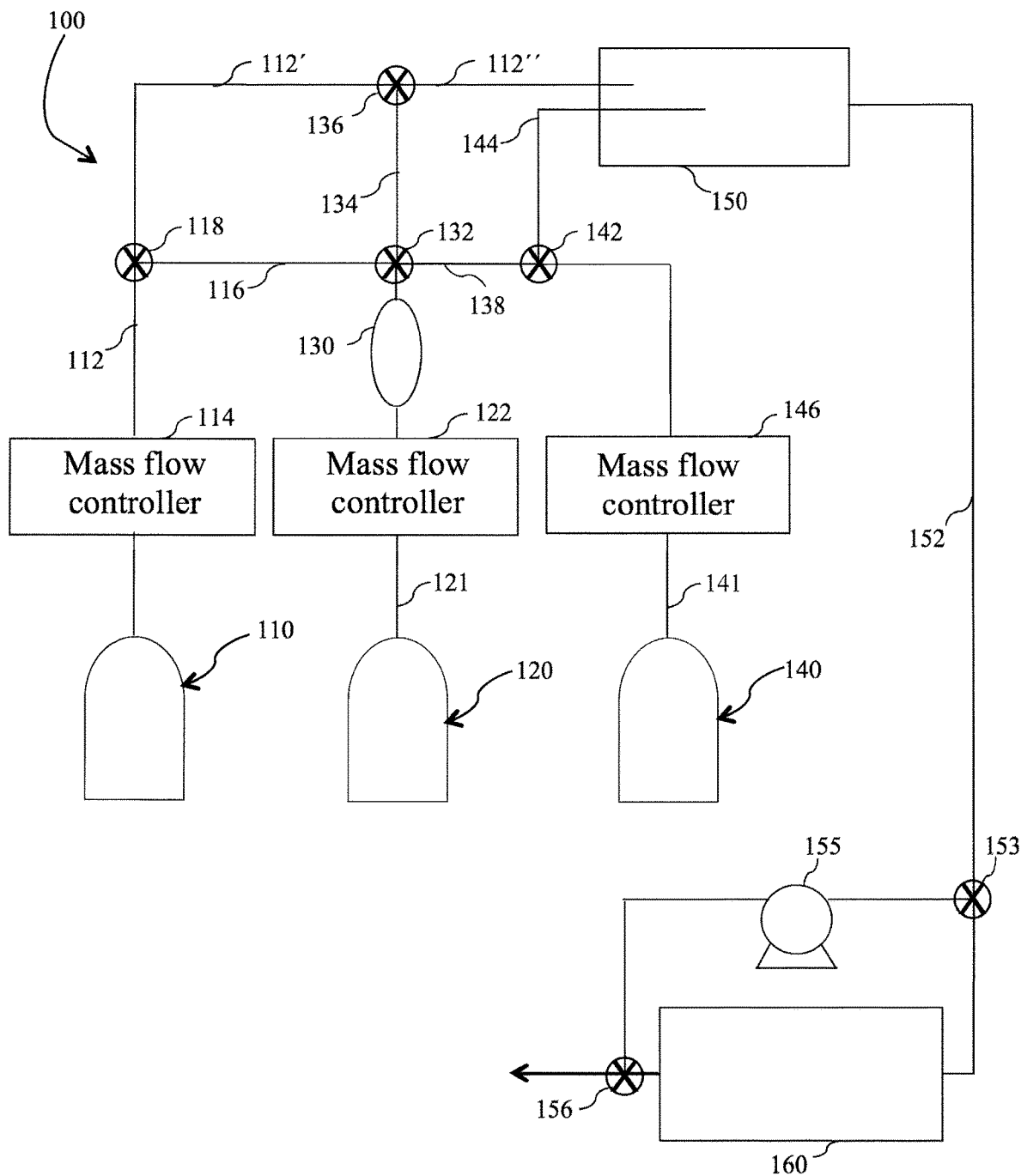
FIG. 1 is a schematic diagram illustrating the configuration of the apparatus for drying a gaseous hydrazine in accordance with one embodiment of the present invention.

The present invention is directed to the use of purifier medias capable of removing water from hydrazine. In addition, the present invention further discloses a system that makes use of ionic liquids to store hydrazine, thereby increasing the safe handling of this highly unstable compound. The ionic liquids further have the advantage of limiting the decomposition of hydrazine.

The purifier media according to the present invention comprises: a support, as more fully described hereinafter; and associated with the support, one or more members of the group consisting of: an active scavenging moiety selected from one or more members of the group consisting of: (i) alkali metal compounds, such as but not limited to $LiNH_2$, dispersed on a support having a surface area in the range of 750-820 $m^2/g$ and a pore volume of 0.6 to 1.5 ml/g (referred to herein as the "Alkali Metal Media"); (ii) metal oxide compounds, alkaline earth metals compounds or hydroxide compounds having the formula $M_xO_y$ or $M(OH)_x$ wherein the metal (M) is selected from the group consisting Na, K, Li, Rb, Cs, Mg, Ca, Sr and Ba; x is an integer from 1-6 and y is an integer of 1-12 and the metal is dispersed on a support having a surface area in the range of 200-230 $m^2/g$ and a pore volume of 0.4 to 0.8 ml/g (referred to herein as the "Metal Oxide Media"); and (iii) a silica-based material with a silica to alumina mole ratio greater than 800 having a surface area in the range of 280-330 $m^2/g$ and a pore volume of 1.0 to 1.5 ml/g (referred to herein the "Silica Media").

Alternatively, the silica based scavengers according to the present invention can exist as a homogenous solution as opposed to the silica on an alumina support. In this particular embodiment the scavenger comprises a homogenous solution of silica-based material comprising silica and alumina with a silica to alumina mole ratio greater than 800.

It has been determined that the active scavenging moieties in the above-described purifier media, must not decompose the hydrazine in order to provide highly effective drying of the moisture impurity-containing gaseous hydrazine, and produce an essentially completely moisture-free gaseous hydrazine gas stream. Consequently, the membrane support should not be a high surface area adsorbent, such as molecular sieves and alumina. Otherwise not all of the hydrazine that enters these types of adsorbents leaves as it decomposes to form $N_2$ and $H_2$. Relative to the possible use of molecular sieves as supports for the scavengers of the present invention, it was indicated herein that molecular sieves are not ideal; however, it was surprising discovered that the practice of the present invention, when involving the use of active scavenging moieties and/or their precursors, overcomes these deficiencies; to the extent that moisture is adsorbed by the molecular sieve support, the moisture impurity is localized for gettering by the active scavenging compounds of scavengers according to the invention. In a preferred aspect, the scavenger as described above, utilizes as the support a material selected from the group consisting of Amberlite resin, carbon-based material, alumina or silica.

FIG. 1, shows an apparatus which may be usefully employed for the removal of moisture impurities from gaseous hydrazine in accordance with the invention. With reference to FIG. 1, the system 100 for producing a substantially moisture free process gas stream, particularly a hydrazine gas stream according to one embodiment of the present invention is described. The reaction chamber 150 is a vessel designed to hold several atmospheres of reactive gases along with the substrate which can be virtually any substrate material, such as, but not limited to powders (not shown) for depositing materials upon.

Reaction chamber 150 has connected to it a gas supply line 112, 112' and 112" and a gas exhaust line 152. Gas supply line 112 is further connected to carrier/purge gas vessel 110 and the supply of carrier/purge gas, such as but not limited to, a nitrogen gas ($N_2$), or hydrogen gas ($H_2$), is controlled by a mass-flow controller 114. Nitride source gas supply vessel 120 for supplying a hydrazine source gas is connected to purifier 130 by gas supply line 121 and purifier 130 is connected to carrier gas lines 116, 134 and 138 via valve 132. Carrier gas enters gas line 116 via valve 118 and is directed to valve 132 where it is mixed with the purified hydrazine gas leaving purifier 130 and the comingled carrier/hydrazine gases and directed into line 112" via line 134 and valve 136. Alternatively, carrier gas and the purified hydrazine gas are mixed and then directed to reaction chamber 150 via valve 142 and supply line 144. Carrier gas and the hydrazine gas are controlled by mass-flow controllers 114 and 122, respectively.

A gas source supply portion 140 for supplying a gas source reactant that is further connected to reaction chamber 150 via gas supply lines 141 and 144 via valve 142. Supply of the gas source is controlled by a mass-flow controller 146.

An exhaust gas possessing means 160 is connected to the gas exhaust pipe 152. The exhaust gas processing means 160 is for exhausting gases remaining in reaction chamber 150. Connected to the exhaust gas processing means 160 is pump 155 via valves 153 and 156.

Figure 2:
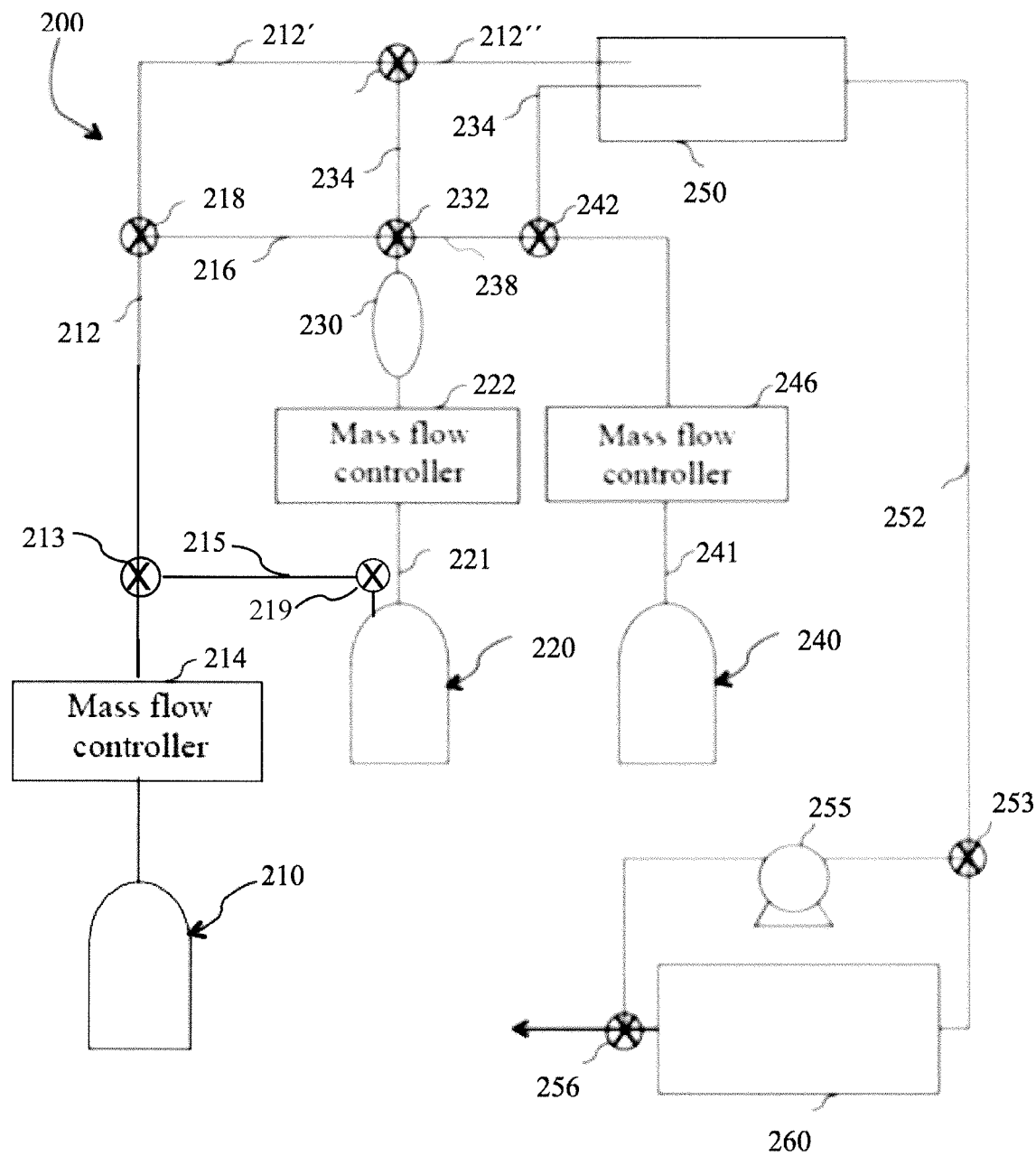
FIG. 2 is a schematic diagram illustrating an alternate configuration of the apparatus for drying a gaseous hydrazine in accordance with another embodiment of the present invention.

Alternatively, as shown in FIG. 2, the hydrazine source gas stored in vessel 220 can also be delivered by passing a carrier gas such as $N_2$ through gas supply line 215, via valves 213 and 219 and into hydrazine source vessel 220, and then flowing the mixture of carrier gas and hydrazine through mass controller 222 and purifier 230 to the reaction chamber 250. This may involve bubbling or otherwise contacting the carrier gas with the hydrazine or hydrazine solution.

Figure 3:
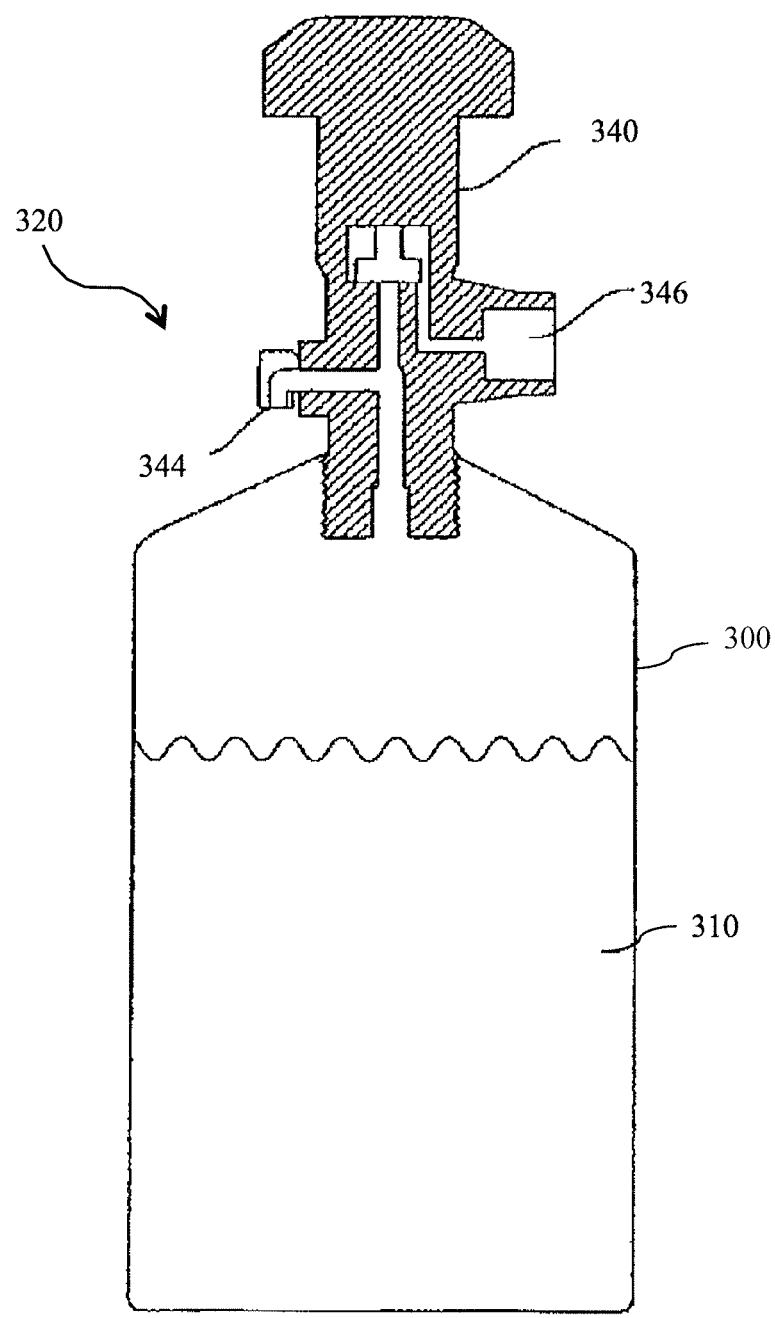
FIG. 3 is embodiment of a device for storing hydrazine in an ionic liquid.

The method of removing moisture from hydrazine may further include providing a vessel having a non-volatile solvent to be mixed with hydrazine resulting in the suppression of the gas phase moisture levels by changing the partitioning of water between the gas and liquid phase of a hydrazine/solvent mixture. In the following embodiment, the solvent discussed is an ionic liquid which can be used to stabilize and purify the hydrazine gas; however, one of skill in the art will recognize those non-volatile solvents that will readily act to suppress the gas phase moisture levels by changing the partitioning of water between the gas and liquid phase of a hydrazine/solvent mixture. In one embodiment, as shown in FIG. 3, an ampoule 320 for storing hydrazine in an ionic liquid is described. The ionic liquid 310 is put into vessel 300 before valve assembly 340 is inserted unto vessel 300. The hydrazine is then added to vessel 300 containing the ionic liquid 310 in the conventional fashion through inlet port 344 in valve assembly 340. The ampoule 320 would then be mechanically agitated to contact the hydrazine with the ionic liquid 310. The fluid may be removed through outlet port 346.

In another embodiment, countercurrent flow of the ionic liquid and the hydrazine is used to contact the hydrazine with the ionic liquid. In another embodiment, contacting the hydrazine with the ionic liquid comprises bubbling the hydrazine through the ionic liquid. The vessel 300 is charged with hydrazine through inlet 344 and through a dip tube (not shown) that extends from inlet 344 down into the interior of vessel 300, from whence it bubbles through ionic liquid 310.

The hydrazine stored within the ionic liquid may be removed from the ionic liquid by any suitable method. The hydrazine is released from the ionic liquid in a substantially unreacted state. Pressure-mediated and thermally-mediated methods and sparging, alone or in combination, are preferred. In pressure-mediated evolution, a pressure gradient is established to cause the hydrazine gas to evolve from the ionic liquid. In one embodiment, the pressure gradient is in the range of about atmospheric pressure to about 4000 psig. In a more preferred embodiment, the pressure gradient is typically in the range from $10^{-7}$ to 600 Torr at 25° C. For example, the pressure gradient may be established between the ionic liquid in the vessel, and the exterior environment of the vessel, causing the hydrazine to flow from the vessel to the exterior environment. The pressure conditions may involve the imposition on the ionic liquid of vacuum or suction conditions which effect extraction of the gas from the vessel.

A variety of ionic liquids can be used in the present invention. Additionally, two or more ionic liquids may be combined for use in any of the aspects of the present invention. In one embodiment, the ionic liquid is selected from mono-substituted imidazolium salts, di-substituted imidazolium salts, tri-substituted imidazolium salts, pyridinium salts, pyrrolidinium salts, phosphonium salts, ammonium salts, tetralkylammonium salts, guanidinium salts, isouronium salts, and mixtures thereof. In this context, the listed salts include any compound that contains the listed cation. In another embodiment, the ionic liquid is selected from a subset of the previous list and includes phosphonium salts, ammonium salts, tetralkylammonium salts, guanidinium salts, isouronium salts, and mixtures thereof, in one embodiment, the ionic liquid includes a cation component selected from mono-substituted imidazoliums, di-substituted imidazoliums, tri-substituted imidazoliums, pyridiniums, pyrrolidiniurns, phosphoniums, ammoniums, tetralkylammoniums, guanidiniums, and uroniums; and an anion component selected from acetate, cyanates, decanoates, halogenides, sulfates, sulfonates, amides, imides, methanes, borates, phosphates, antimonates, tetrachloroaluminate, thiocyanate, tosylate, carboxylate, cobalt-tetracarbonyl, trifluoroacetate and tris(trifluoromethylsulfonyl)methide. Halogenide anions include chloride, bromide, iodide. Sulfates and sulfonate anions include methyl sulfate, ethyl sulfate, butyl sulfate, hexyl sulfate, octyl sulfate, hydrogen sulfate, methane sulfonate, dodecylbenzene sulfonate, dimethyleneglycolmonomethylether sulfate, trifluoromethane sulfonate. Amides, imides, and methane anions include dicyanamide, bis(pentafluoroethyl sulfonyl)imide, bis(trifluoromethylsulfonyl)imide, bis(trifluoromethyl)imide. Borate anions include tetrafluoroborate, tetracyanoborate, bis[oxalato(2-)]borate, bis[1,2-benzenediolato(2-)—O,O]borate, bis[salicylato(2-)]borate. Phosphate and phosphinate anions include hexafluorophosphate, diethylphosphate, bis(pentafluoroethyl)phosphinate, tris(pentafluoroethyl)trifluorophosphate, tris(nonafluorobutyl)trifluorophosphate. Antimonate anions include hexafluoroantimonate. Other anions include tetrachloroaluminate, acetate, thiocyanate, tosylate, carboxylate, cobalt-tetracarbonyl, trifluoroacetate and tris(trifluoromethyl sulfonyl)methide. Various ionic liquids are available from BASF, Merck, Strem Chemicals, and Aldrich.

Preferred ionic liquids used in the present invention may be divided into the following categories: standard, acidic, acidic water reactive, and basic. Standard ionic liquids include but are not limited to 1-ethyl-3-methylimidazolium chloride, 1-ethyl-3-methylimidazolium methanesulfonate, 1-butyl-3-methylimidazolium chloride, 1-butyl-3-methylimidazolium methanesulfonate, methyl-tri-n-butylammonium methyl sulfate, 1-ethyl-2,3-dimethylimidazolium ethyl sulfate, 1,2,3-trimethylimidazolium methyl sulfate. Acidic ionic liquids include methylimidazolium chloride, methylimidazolium hydrogensulfate, 1-ethyl-3-methylimidazolium hydrogensulfate, 1-butyl-3-methylimidazolium hydrogensulfate. Acidic water reactive liquids include 1-ethyl-3-methylimidazolium tetrachloroaluminate and 1-butyl-3-methylimidazolium tetrachloroaluminate. Basic ionic liquids include 1-ethyl-3-methylimidazolium acetate and 1-butyl-3-methylimidazolium acetate.

EXPERIMENTAL

In order to illustrate the invention, the following examples are included. However, it is to be understood that these examples do not limit the invention and are only meant to suggest a method of practicing the invention. Persons skilled in the art will recognize that non-exemplified methods may be successfully performed by making routine modifications apparent to those skilled in the art.

Experiments were conducted to measure moisture levels after exposing samples of the starting liquid to various purification materials. The starting hydrazine compositions, already about 99.98% pure, were passed through purifier materials with different compositions. Moisture levels in the purified samples were measured using gas chromatography/mass spectroscopy (GC-MS).

Example 1

Desiccation of Hydrazine by a Metal Oxide Media (Table 1)

Liquid hydrazine having a moisture concentration of 2440 ppm was dried under static conditions. Under static conditions the hydrazine was contacted with a metal oxide for two weeks and the liquid sample was tested at week one and week two for a change in moisture concentration. The samples that were dried were then passed via a column filled with the same metal oxide media. In this example the sample was passed through the column one single time; however, it is possible to achieve a higher degree of purity by passing the sample through the column multiple times to remove more moisture. Alternatively, any arrangement wherein the liquid hydrazine is circulated through a bed of media is contemplated by this invention.

TABLE 1

| Sample | Metal Oxide Media | Liquid Hydrazine | Duration of desiccation | Initial $H_2O$ concentration | Final $H_2O$ concentration |
|---|---|---|---|---|---|
| #1-1 (static) | 2.5 g | 2.5 ml | 1 week | 2440 ppm | 759 ppm |
| #1-2 (static) | 2.5 g | 2.4 ml | 2 weeks | 2440 ppm | 54 ppm |
| #1-3 (via column) | 2.6 g (3.8 ml) | 2.0 ml | — | 2440 ppm | 39 ppm |

The results above demonstrate that the metal oxide materials can remove water from about 2440 ppm to 39 ppm in liquid phase hydrazine. It is very likely that with optimization it would be possible to get the liquid phase moisture down to levels of single digit ppm to ppb levels.

Purification Processes

The apparatuses described herein may be utilized during the deposition of nitrogen-containing films, wherein the nitrogen source is hydrazine. Accordingly, one aspect of the invention relates to a method of depositing a nitrogen-containing film using any of the apparatuses described herein for generating a chemical precursor gas. The nitrogen precursor contained within the apparatus can be used as the nitrogen source in the film deposition process. One or more embodiments relate to vaporizing hydrazine and then flowing the described through a purifier wherein the scavengers according to the present invention within the purifier canister containing an Alkali Metal Media, a Metal Oxide Media or a Silica Media.

Summary of Desiccation Results

In certain embodiments, the solution comprises pure hydrazine, meaning in which no other chemicals are deliberately included but allowing for incidental amounts of impurities. In certain embodiments, the solution comprises from about 50% to about 99% by weight of hydrazine, or from about 65% to about 99%, from about 75% to about 99%, from about 80% to about 99%, from about 85% to about 99%, from about 90% to about 99%, from about 95% to about 99%, from about 96% to about 99%, from about 97% to about 99%, from about 98% to about 99%, or from about 99% to about 100% by weight hydrazine, with the remaining components comprising solvents and/or stabilizers. In some embodiments, the solution comprises hydrazine at concentrations greater than 99.9% purity and, in some embodiments, the solution comprises hydrazine at concentrations greater than 99.99% purity. Selection of an appropriate non-aqueous hydrazine solution will be determine by the requirements of a particular application or process. The removal of moisture from vapor phase hydrazine balance nitrogen mixtures was performed using three different scavengers associated with a support and the data is presented in FIGS. 4-6 and summarized below in Table 2.

TABLE 2

| Media | Alkali Metal Media | Silica Media | Metal Oxide Media |
|---|---|---|---|
| Challenge gas | 1.4% $N_2H_4$, 35 ppm $H_2O$, in $N_2$ balance, 500 sccm 1 atm | | |
| Max. $N_2H_4$ @ outlet | 1.3% | 1.3% | 1.0% |
| $H_2O$ @ outlet | <0.5 ppm (Below LDL) | <0.5 ppm (Below LDL) | <0.5 ppm (Below LDL) |
| Duration for conditioning | 6-8 hours | 6-8 hours | >8 hr no $N_2H_4$ bled during the first hour |
| Heat generation | No | No | 2° C. |
| Other impurities detected | 0.4% $NH_3$ detected during the first 2 hours | Not detected by FTIR | Not detected by FTIR |
| Material | Lithium amide ($LiNH_2$) on Amberlite resin | Silica | $Cs_2O$, $Al_2O_3$ |
| Compatibility | No gas evolution | No gas evolution | Gas evolution |

Figure 4:
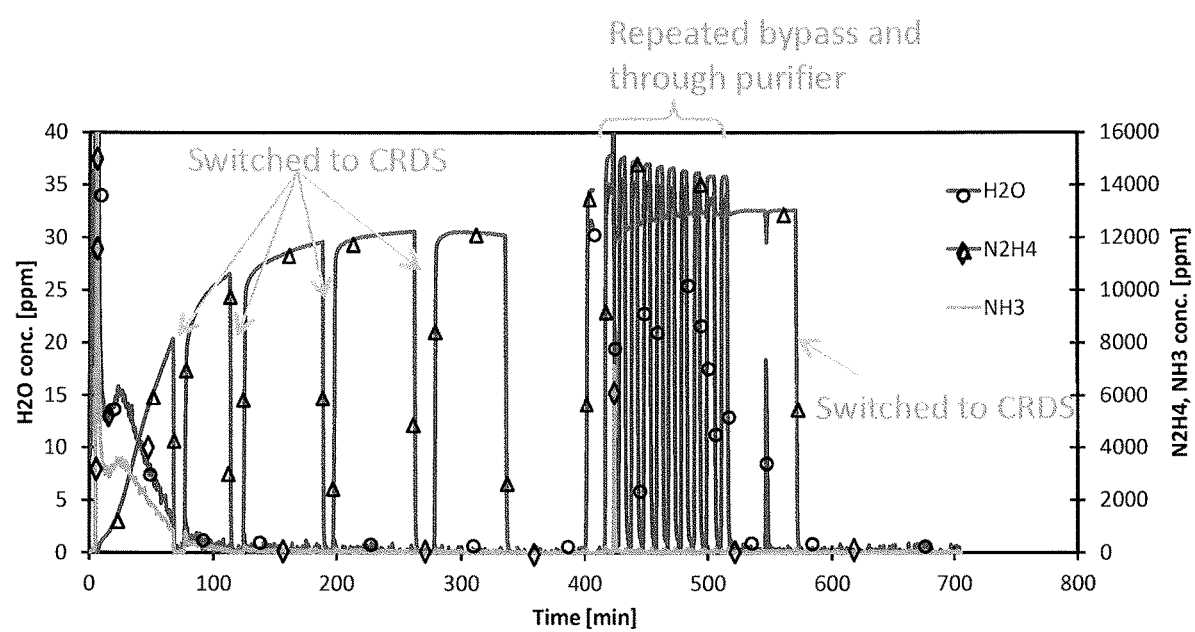
FIG. 4 is gas concentration trend measure by FTIR when exposed to the Alkali Metal Media.
Figure 5:
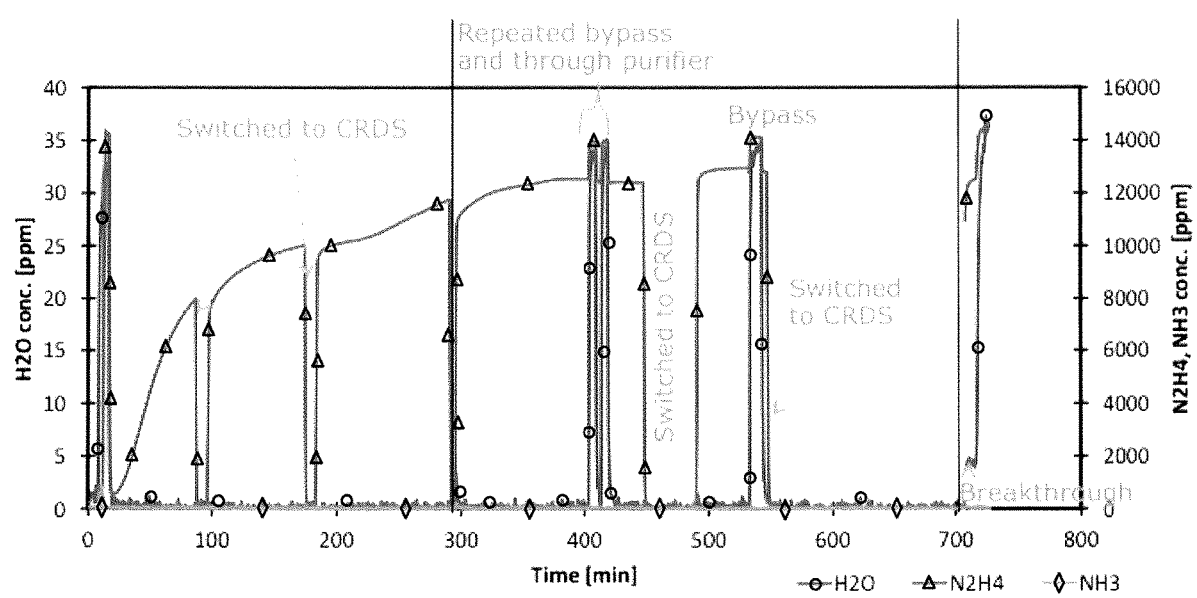
FIG. 5 is gas concentration trend measure by FTIR when exposed to the Silica Media.
Figure 6:
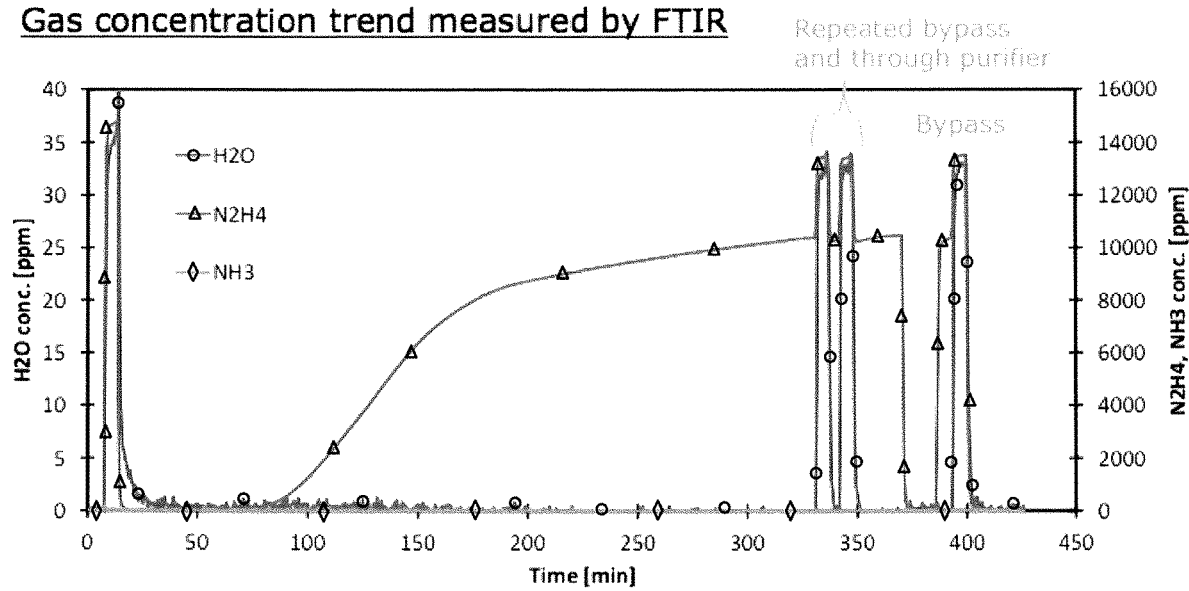
FIG. 6 is gas concentration trend measure by FTIR when exposed to the Metal Oxide Media.

In short, the data presented in FIG. 4 demonstrates that the concentration of hydrazine ($N_2H_4$), passed through the Alkali Metal Media, went up to 13,000 ppm, $H_2O$ at the outlet was below LDL (0.5 ppm); while, 4,000 ppm $NH_3$ was detected for the initial 120 minutes when the purification material used. FIG. 4 demonstrates that the concentration of hydrazine ($N_2H_4$), passed through the Silica Media, went up to 13,000 ppm, $H_2O$ at the outlet was approximately 0.6 ppm, slightly higher than that through the Alkali Metal Media. And after about 700 minutes, moisture breakthrough was detected. No $NH_3$ was detected. FIG. 6 demonstrates that during the first 60 minutes, no hydrazine ($N_2H_4$) bled through the Metal Oxide Media. After 360 minutes $N_2H_4$ went up only to 10,000 ppm. 1 ppm $H_2O$ bled during the first 150 minutes; however, $H_2O$ reduced below LDL after 150 minutes conditioning. No $NH_3$ was detected and the media heated up by 2° C.

The moisture levels present in hydrazine in its vapor phase after flowing over the purification materials of the present invention will be below 1 ppm and preferably will be in the range of 1 ppb to 1.0 ppm, or 1 ppb to 50 ppb, or 50 ppb to 100 ppb or 0.1 ppm to 1.0 ppm.

On initial exposure of the Alkali Metal Media to hydrazine, it was observed that ammonia is detected in the first hour or so. Since the Alkali Metal Media is fully purged with $N_2$ after it is made, it is believed that the observed $NH_3$ is not from any residual $NH_3$ from the original production of the material, but rather from a displacement reaction on the Alkali Metal Media with the $N_2H_4$. The $LiNH_2$ groups in the Alkali Metal Media are therefore most likely reacting with $N_2H_4$ forming $LiN_2H_3$ and $NH_3$.

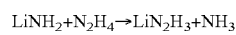

$$LiNH_2 + N_2H_4 \rightarrow LiN_2H_3 + NH_3$$

The $LiN_2H_3$ is the species that reacts with the $H_2O$ in the hydrazine forming LiOH and $N_2H_4$.

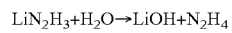

$$LiN_2H_3 + H_2O \rightarrow LiOH + N_2H_4$$

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, materials and methods according to some embodiments are described herein. While the invention has been described in detail herein in accord with certain preferred embodiments thereof, many modifications and changes therein may be effected by those skilled in the art. Without further elaboration it is believed that one skilled in the art can, using the description set forth above, utilize the invention to its fullest extent.

Having disclosed several embodiments, it will be recognized by those of skill in the art that various modifications, alternative constructions, and equivalents may be used without departing from the spirit of the disclosed embodiments. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the dielectric material" includes reference to one or more dielectric materials and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A process for removing moisture from hydrazine in either in a vaporous or aqueous state, comprising: contacting hydrazine containing moisture with a scavenger wherein the scavenger comprises a support having associated therewith an active scavenging moiety selected from one of more members of the group consisting of: alkali metal compounds, alkaline earth metal compounds, metal oxide or hydroxide compounds and silica-based material wherein after contacting said hydrazine containing moisture with said scavenger the moisture in said hydrazine is removed to a level of less than 2440 ppm.

2. The process of claim 1, wherein said moisture in said hydrazine, after contacting said hydrazine containing moisture with said scavenger, is present at concentrations of less than 1 ppm.

3. The process of claim 1, wherein said moisture in said hydrazine, after contacting said hydrazine containing moisture with said scavenger, is present at concentrations of less than 50 ppm.

4. The process of claim 1, wherein said moisture in said hydrazine, after contacting said hydrazine containing moisture with said scavenger, is present at concentrations of less than 500 ppb.

5. The process of claim 1, wherein said moisture in said hydrazine, after contacting said hydrazine containing moisture with said scavenger, is present at concentrations of less than 1 ppb.

6. The process of claim 1, wherein said moisture in said hydrazine, after contacting said hydrazine containing moisture with said scavenger, is present at concentrations of less than 100 ppm.

7. The process of claim 1, wherein said moisture in said hydrazine, after contacting said hydrazine containing moisture with said scavenger, is present at concentrations of less than 30 ppm.

8. The process of claim 1, wherein said moisture in said hydrazine, after contacting said hydrazine containing moisture with said scavenger, is present at concentrations of less than 5 ppm.

9. The process of claim 1, wherein said support, associated with said active scavenging moiety, is selected from the group consisting of Amberlite resin, carbon-based material, alumina and silica.

10. The process of claim 9, wherein said active scavenging moiety is $LiNH_2$.

11. The process of claim 9, wherein said active scavenging moiety is a metal oxide compound having the formula $M_xO_y$, wherein the metal (M) is selected from the group consisting Na, K, Li, Rb, Cs, Mg, Ca, Sr and Ba, and wherein x is an integer from 1-6 and y is an integer of 1-12.

12. The process of claim 9, wherein said active scavenging moiety is a metal hydroxide compound having the formula $M(OH)_x$ wherein the metal (M) is selected from the group consisting Na, K, Li, Rb, Cs, Mg, Ca, Sr and Ba and wherein x is an integer from 1-4.

13. The process of claim 9, wherein said silica-based material comprises silica with an alumina support wherein the silica to alumina mole ratio greater than 800.

14. The process of claim 10, wherein said $LiNH_2$ is dispersed on said support having a surface area in the range of 750-820 $m^2/g$ and a pore volume of 0.6 to 1.5 ml/g.

15. The process of claim 11, wherein said metal oxide is dispersed on said support having a surface area in the range of 200-230 $m^2/g$ and a pore volume of 0.4 to 0.8 ml/g.

16. The process of claim 12, wherein said metal hydroxide is dispersed on said support having a surface area in the range of 200-230 $m^2/g$ and a pore volume of 0.4 to 0.8 ml/g.

17. The process of claim 13, wherein said alumina has a surface area in the range of 280-330 m²/g and a pore volume of 1.0 to 1.5 ml/g.

18. The process of claim 1, wherein after contacting the vaporous phase of said moisture containing hydrazine with said scavenger said moisture level is reduced below 1 ppm.

19. A method of removing trace amount of moisture from a water contaminated hydrazine, comprising:
(a) providing a purifying material having an alkali metal compound dispersed on a support; and (b) flowing said contaminated hydrazine through said purifying material wherein after flowing is completed the moisture is removed from the contaminated hydrazine to a level below about 0.5 parts per million.

20. The method of claim 19, wherein said alkali material is $LiNH_2$ and said support is selected from the group consisting of Amberlite resin, carbon-based material, alumina and silica.

21. A method of removing trace amount of moisture from a water contaminated hydrazine, comprising:
(a) providing a purifying material having a metal oxide compound having the formula $M_xO_y$ wherein M is selected from the group consisting Na, K, Li, Rb, Cs, Mg, Ca, Sr and Ba dispersed on a support, and wherein x is an integer from 1-6 and y is an integer of 1-12; and
(b) flowing said contaminated hydrazine through said purifying material wherein after flowing is completed the moisture is removed from the contaminated hydrazine to a level below about 1 parts per million.

22. The method of claim 21, wherein said support is selected from the group consisting of Amberlite resin, carbon-based material, alumina and silica.

23. A method of removing trace amount of moisture from a water contaminated hydrazine, comprising:
(a) providing a silica-based material comprising silica and alumina with a silica to alumina mole ratio greater than 800; and (b) flowing said contaminated hydrazine through said silica-based material wherein after flowing is completed the moisture is removed from the contaminated hydrazine to a level below about 1 parts per million.

24. A method of drying hydrazine to water levels below 5 ppb, comprising:
mixing hydrazine with an ionic liquid and storing said mixture in a vessel;
releasing from said mixture a hydrazine gas; and
directing said hydrazine gas through a purifier material wherein said purifier material comprises a support having associated therewith an active scavenging moiety selected from one of more members of the group consisting of: alkali metal compounds, metal oxide or hydroxide compounds and silica-based material.

25. A method of drying hydrazine to water levels below 1 ppb, comprising contacting hydrazine with an ionic liquid thereby forming a hydrazine/ionic liquid mixture;
suppressing the gas phase moisture levels in said hydrazine/ionic liquid mixture by changing the partitioning of water between the gas and liquid phase of said hydrazine/ionic liquid mixture.

* * * * *